Nov. 4, 1958  H. J. HAWTHORNE ET AL  2,858,958
QUICK CHANGE COUPLING
Filed Jan. 26, 1955  4 Sheets-Sheet 1

INVENTORS
Herbert J. Hawthorne
Earl M. Weaver

BY
Cushman, Darby & Cushman
ATTORNEYS

Nov. 4, 1958   H. J. HAWTHORNE ET AL   2,858,958
QUICK CHANGE COUPLING
Filed Jan. 26, 1955   4 Sheets-Sheet 3

INVENTORS
Herbert J. Hawthorne
Earl M. Weaver
BY
Cushman, Darby & Cushman
ATTORNEYS Nov. 4, 1958 H. J. HAWTHORNE ET AL 2,858,958
QUICK CHANGE COUPLING
Filed Jan. 26, 1955 4 Sheets-Sheet 4

INVENTORS
Herbert J. Hawthorne
Earl M. Weaver
BY Cushman, Darby & Cushman
ATTORNEYS

United States Patent Office 2,858,958
Patented Nov. 4, 1958

2,858,958

QUICK CHANGE COUPLING

Herbert J. Hawthorne and Earl M. Weaver, Houston, Tex.

Application January 26, 1955, Serial No. 484,156

9 Claims. (Cl. 220—40)

This invention relates to couplings and more particularly to couplings for use in quickly opening and closing a valve access opening of a pump or the like.

In its broadest aspects the invention contemplates the provision of an improved structure for locking and unlocking a pair of members axially by relative rotation therebetween of less than one revolution. More specifically, in accordance with the present invention there are provided on the members, oppositely faced inclined inserting surfaces operable upon relative rotation of the members in one direction to move the same axially toward each other, oppositely faced locking surfaces operable upon further relative rotation to retain said members axially together, and oppositely faced inclined removing surfaces operable upon further relative movement in the opposite direction after disengagement of said locking surfaces to move said members axially apart.

While the invention is capable of broad utility, it has been found particularly useful in connection with valve access openings for oil well pumps and the like. In the known pumps used in oil field work, the access openings to the pump valves are conventionally covered by a cover plate bolted down in the usual case by two or more bolts. Because of the time and trouble necessary in removing and replacing such a cover plate, it has become the practice to forego working on the pump valves until the pump is virtually inoperable and/or cleaning or repair thereof is absolutely essential.

The present invention contemplates the provision of a valve access opening plug or closure which may be locked or unlocked by rotation of less than one revolution. With the quick opening and closing plug of the present invention, the time and trouble heretofore experienced in gaining access to the pump valves is materially reduced. Indeed, with the present invention, it becomes more convenient to check the operation of the valves before pumping efficiency is materially reduced. In this manner, the pumps may be maintained at maximum efficiency and less operating time is lost during repairs and cleaning. Moreover, the present invention greatly simplifies the problem of draining water from pumps while standing idle overnight in areas where there is danger of freezing.

Accordingly, it is an object of the present invention to provide an improved structure for quickly locking and unlocking two members by relative rotation therebetween of less than one revolution.

Another object of the present invention is the provision of a quick change plug for a valve access opening of a pump which materially reduces the time and effort heretofore necessary in gaining access to the pump valve for cleaning and repair purposes.

A further object of the invention is the provision of a quick change plug for a valve access opening which is adaptable for use on conventional pumps by means of a novel adaptor plate.

A still further object of the invention is the provision of an improved quick change, valve access opening plug which may be rotated in either direction into locking engagement with an adaptor plate depending on the individual requirements thereof.

Still another object of the invention is the provision of a quick change plug having an improved lug structure which cooperates with the sealing element thereof so that the latter may be quickly inserted within and removed from a pump valve access opening in an improved manner.

A still further object of the present invention is the provision of an improved quick change plug for a pump valve access opening and a cooperating adaptor plate therefor, which are simple in construction, easy to operate and economical in manufacturing and maintenance costs.

These and other objects of the present invention will become more apparent during the course of the following detailed description and appended claims.

The invention may best be understood with reference to the accompanying drawings wherein illustrative embodiments are shown.

Figure 1:
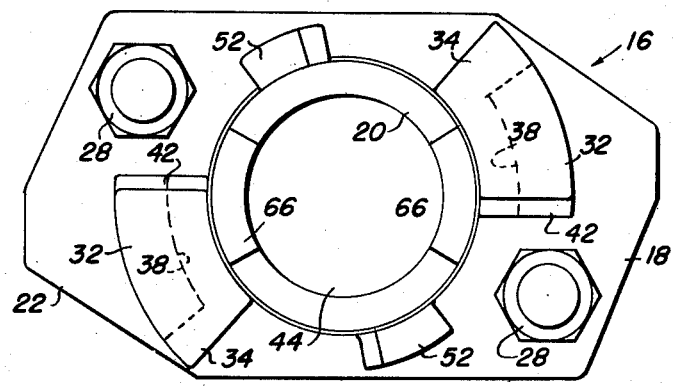
Figure 1 is a top plan view of one embodiment of a quick change plug of the present invention showing the same engaged within an adaptor plate for a pump.
Figure 2:
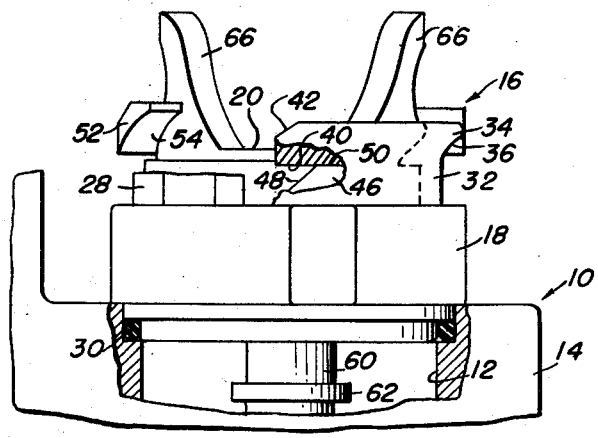
Figure 2 is a fragmentary side elevational view, partly broken away showing the assembly illustrated in Figure 1.
Figure 3:
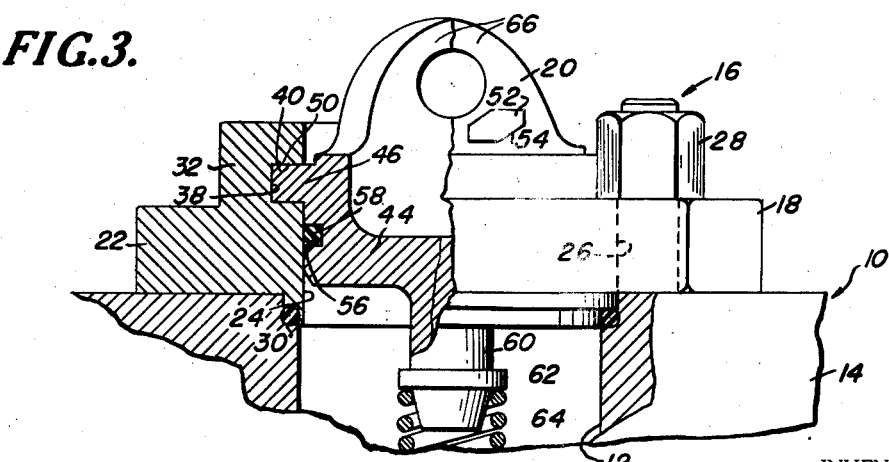
Figure 3 is a fragmentary front elevational view of the assembly shown in Figure 1 with certain parts shown in section.

Referring now more particularly to the drawings, there is shown in Figures 1-3 a portion of a known pump 10 utilized in oil field work having a valve access opening 12 formed in housing 14 of the pump. The usual cover plate of the opening has been removed and a closure assembly 16 constructed in accordance with the principles of the present invention has been provided in lieu thereof.

The assembly 16 comprises, in general, an adaptor plate member 18 which may be bolted to the pump housing preferably by means of the bolts previously utilized to secure the conventional cover plate in place and a removable plug member 20 which cooperates with the adaptor plate member to open and close the pump valve access opening. As will become more apparent hereinafter, the plug member may be quickly locked into axial engagement with the plate member to close the opening 12 by rotation of the plug in one direction substantially less than one revolution. Likewise, the plug may be quickly removed from the plate member by rotation of the plug in the opposite direction a corresponding fractional revolution thereof.

The adaptor plate member 18 comprises a plate 22 provided with a central aperture 24 and a pair of spaced holes 26 through which suitable fastening means, such as bolts 28 may extend to secure the plate to the pump housing with the aperture 24 in alignment with the valve access opening 12. A suitable gasket or sealing element 30 may be positioned between cooperating annular grooves in the plate and pump housing to assure a pressure-tight fit.

Extending upwardly from the upper surface of the plate 22 is a pair of annularly spaced lugs 32, each of which includes a spaced projection 34 having a downwardly facing inclined inserting surface 36 extending upwardly from one end of the lug. Each of the lugs has an arcuate groove 38 formed therein below the projection so as to provide a downwardly facing locking surface 40 which extends at an angle from the surface 36 and is disposed generally horizontally. The end of the lug opposite from the projection 36 preferably has its upper corner cut off to provide an upwardly facing, inclined removing surface 42.

The plug member 20 preferably comprises an annular body 44 having a lower pair of annular spaced lugs 46 extending radially outwardly therefrom, each of which has a cross-sectional shape generally conforming to the shape of the grooves 38 so as to engage therein. Each of the lower lugs includes an upwardly facing, inclined inserting surface 48 extending upwardly from one end thereof and a generally horizontally disposed, upwardly facing locking surface 50 extending at an angle therefrom. An upper pair of annularly spaced lugs 52 extend radially outwardly from the body member 44 at points spaced axially above and radially displaced from the lower lugs 46. Each lug 52 includes a downwardly facing inclined removing surface 54 extending downwardly from one end thereof.

The portion of the body 44 extending below the lower lug 46 is preferably provided with an annular groove 56 within which a suitable gasket or sealing element, such as O-ring 58, may be mounted. The extreme lower end portion of the body member terminates in a central, axial projection 60 having an annular shoulder 62 intermediate its ends for engaging a coil spring 64 of the pump valve, not shown, in Figures 1–3. Extending upwardly from the body are a pair of apertured ears 66 through which a suitable rod, not shown, may be engaged for turning the plug.

Figure 4:
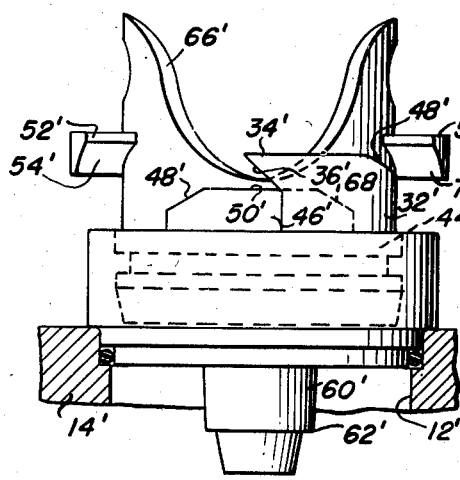
Figure 4 is a fragmentary side elevational view of a modified quick change plug showing the same engaged within a left handed adaptor plate for a pump.
Figure 5:
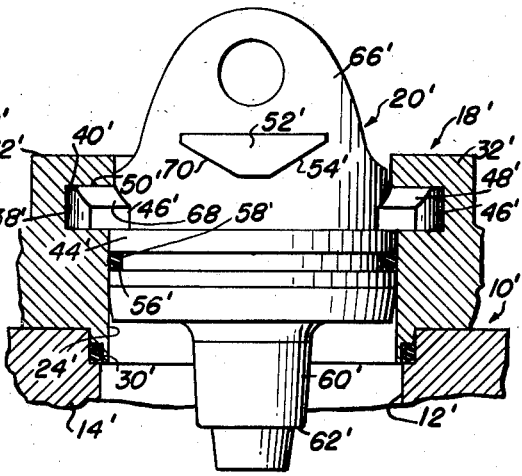
Figure 5 is a fragmentary front elevational view of the plug illustrated in Figure 4, showing the adaptor plate and pump in section.

It has been found that in certain of the known pumps, the valve access openings are arranged so that it is necessary, because of space requirements, to provide a plug which may be locked by rotation in a counterclockwise direction in contradistinction to the usual clockwise rotation normally utilized and shown in Figures 1–3. Accordingly, in Figure 4, there is shown an adaptor plate member 18' arranged to receive a plug in locking engagement by counterclockwise rotation, which adaptor plate member 18' is identical with the adaptor plate member 18 shown in Figures 1–3 with the exception of the disposition of the inserting and removing surfaces. As shown in Figures 4 and 5, wherein like parts are designated by corresponding primed numbers, each lug 32' has a projection 34' which extends from the opposite end of the lug 32' as that of the projection 34 of the embodiment shown in Figures 1–3. An inclined inserting surface 36' extends downwardly from each projection 34' in angular relation to horizontal locking surface 40'. The opposite end of each lug 32' has its upper corner cut off to provide an inclined removing surface 42'.

Figure 6:
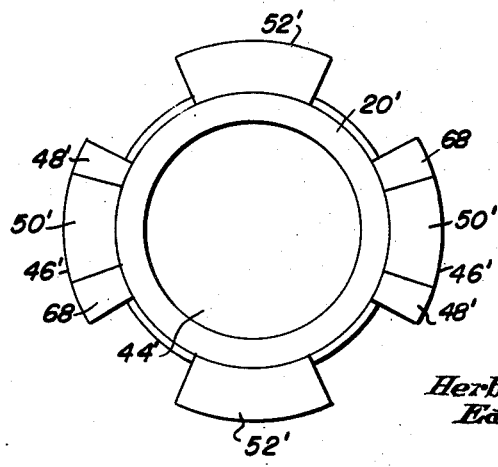
Figure 6 is a top plan view of the plug shown in Figures 4 and 5.

In accordance with the principles of the present invention, there is shown in Figures 4–6 a plug member 20' arranged to be used with either adaptor plate members so as to close a valve access opening by either right or left hand rotation depending upon the individual requirements. The plug member 20' includes an annular body 44' provided with a lower pair of annular spaced lugs 46' extending radially outwardly therefrom. The central portion of each lug 46' has a cross-sectional shape generally conforming to the shape of the grooves 38 and 38' so as to engage therein. Each lug 46' is further provided with an upwardly facing right hand inclined inserting surface 48', an upwardly facing locking surface 50' extending at an angle from the inserting surface 48', and an upwardly facing left hand inclined inserting surface 68 extending from the opposite end, and engaging with the locking surface 50'. Disposed above the lugs 46' in axially spaced relation therefrom is an upper pair of annularly spaced lugs 52' extending radially outwardly from the body 44'. Each of the lugs 52' is provided with a right hand downwardly facing inclined removing surface 54' extending downwardly from one end thereof and a left hand downwardly facing inclined removing surface 70 extending downwardly from the opposite end thereof.

Figure 7:
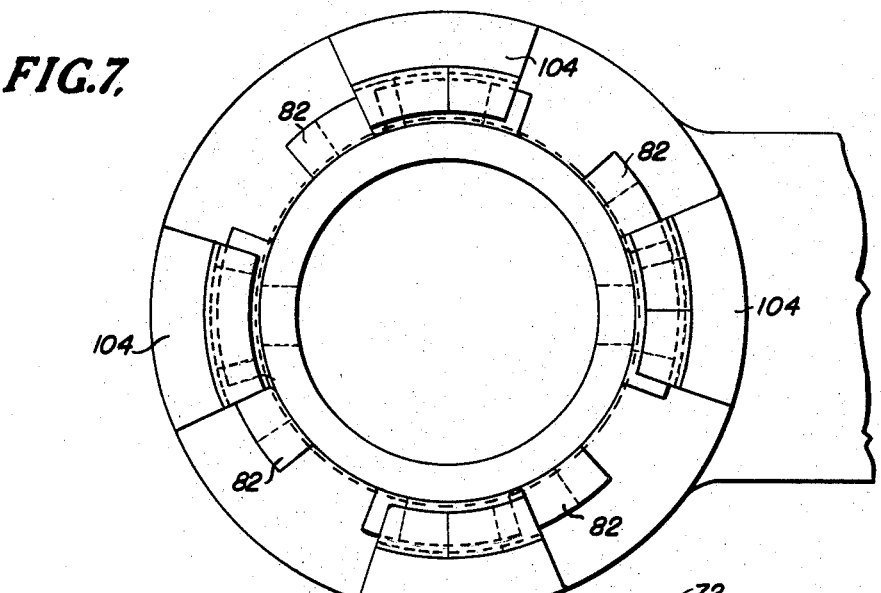
Figure 7 is a fragmentary top plan view of a pump having a modified form of the quick change plug of the present invention engaged within the valve access opening thereof.
Figure 8:
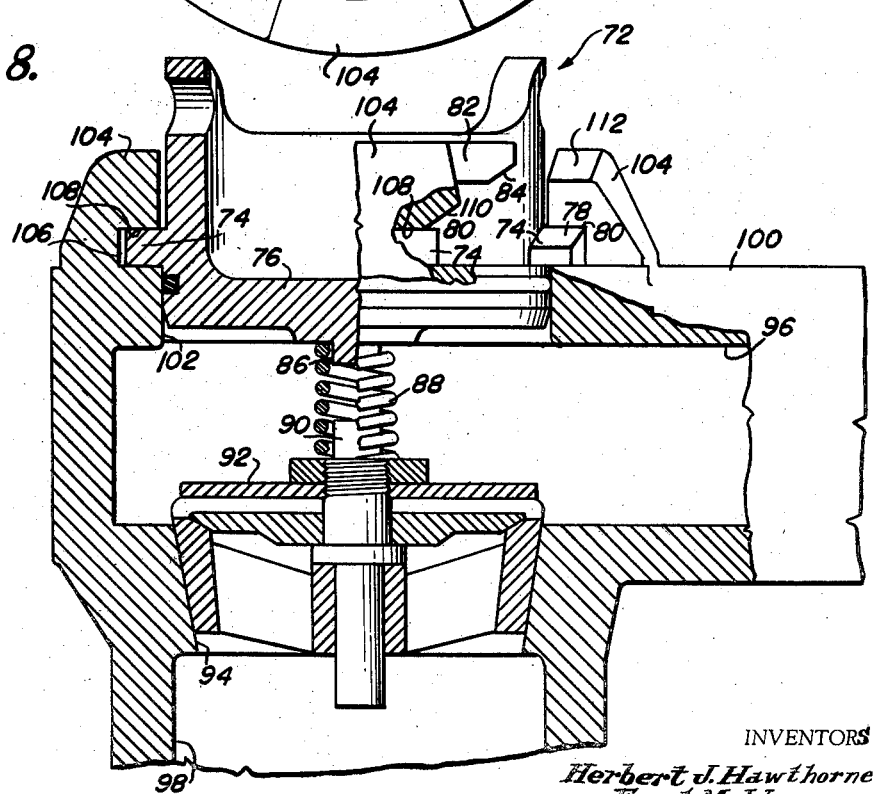
Figure 8 is a fragmentary front elevational view of the structure shown in Figure 7 with certain parts broken away and shown in section for clear illustration.

While the embodiments of the invention described above are illustrated as being adapted to be utilized with conventional pumps, it will be understood that it is within the contemplation of the present invention to provide a pump having an access opening therein which is initially formed to receive a quick change plug of the type described above. To this end, there is shown in Figures 7 and 8 one arrangement wherein the valve access opening of the pump is originally constructed to receive a quick change plug 72 generally of the same construction as the plugs illustrated in Figures 1–3. It will be understood, however, that the plug construction is not limited to the provision of pairs of cooperating lugs, and as shown in Figures 7 and 8, the plug member 72 may include four annularly spaced lower lugs 74 extending radially outwardly of the body 76 of the plug member. As in the embodiments described above, each lug 74 is provided with an upwardly facing inclined inserting surface 78 extending from one end thereof, and a substantially horizontally disposed upwardly facing locking surface 80 extending at an angle from the inserting surface 78. Spaced above each lug 74 in circumferentially spaced relation thereto is an upper lug 82. Each of the lugs 82 includes a downwardly facing inclined removing surface 84 extending from one end thereof.

As with the embodiments described above, the lower surface of the body 76 of the plug member is provided with a central projection 86 for receiving the upper end of a coil spring 88, the lower end of which surrounds an upwardly extending projection 90 formed on the valve 92 of the pump. It will be understood that a suitable operating mechanism, not shown, is provided for actuating the valve so as to permit passage of the fluid through the valve seat 94 between passageways 96 and 98 formed in the pump housing 100. Formed in the housing 100 above the valve seat 94 is a valve access opening 102 which communicates with the passage 96. Extending upwardly in circumferentially spaced relation around the access opening 102 are four lugs 104, each of which is provided with an arcuate groove 106 conforming in cross-sectional configuration to the cross-section configuration of the lugs 74. The downwardly facing upper surface 108 provided by each of the grooves 106 constitutes a locking surface adapted to engage the locking surface 80 of the corresponding lug 74. Extending downwardly from one end of each of the lugs 104 into engagement with the locking surface 108 is a downwardly facing inclined inserting surface 110 arranged to cooperate with the inserting surface 78 of the corresponding lug 74. The upper surface of each lug 104 is provided with an inclined removing surface 112 extending upwardly from the end thereof opposite the inserting surface 110.

Figure 9:
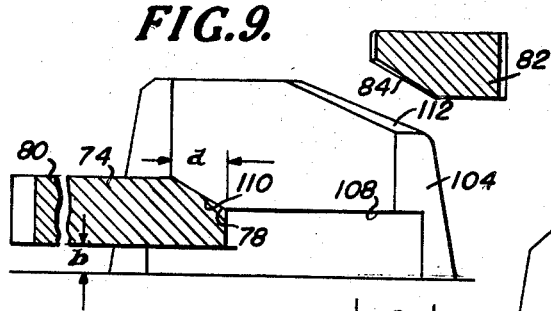
Figures 9-11 are fragmentary sectional views illustrating the cooperation between the locking lugs of the present invention during a cycle of movement.
Figure 10:
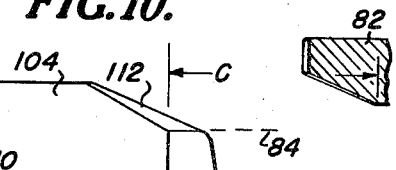
Figure 11:
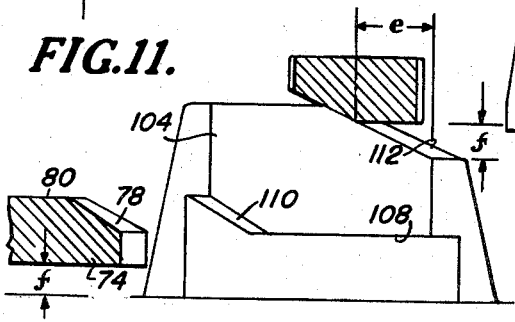

Referring now to Figures 9–11, wherein a series of fragmentary views, illustrating the coaction between the cooperating lugs and the surfaces thereof, are shown with the members in varying positions throughout a complete cycle of movement into and out of locking engagement. Figure 9 shows the relative position of the lugs after the plug has been initially inserted and rotated until the cooperating inclined inserting surfaces 78 and 110 are engaged. Rotation of the plug an annular distance $a$, will cause the plug to move axially with respect to the pump housing, by virtue of the inclined engagement of the inserting surfaces, an axial distance $b$ until the locking surfaces 80 and 108 engage each other. The plug may then be rotated a further annular distance $c$, as shown in Figure 10, so that the respective locking surfaces engage each other along substantially their entire areas to insure that the plug will be held within the valve access opening in a locked condition. The movement of the plug the distance $c$ is preferably limited by engagement of the lugs 82 with the lugs 104.

When it is desired to release the plug, the latter is rotated in the opposite direction an annular distance $d$ thereby causing the locking surfaces 80 and 108 to move out of engagement and the removing surfaces 84 and 112 to engage each other. Further rotation of the plug an annular distance $e$ will effect an axial movement of the plug away from the valve access opening an axial distance $f$ which is sufficient to free the plug, as shown in Figure 11.

While the action of the lugs and surfaces are described in connection with the embodiment illustrated in Figures 7 and 8, it will be understood that the same action is achieved in the embodiments disclosed in Figures 1–3 and 4–6. With the embodiment of Figures 4–6, when a left hand adaptor plate is utilized, the left hand inserting and removing surfaces will be utilized and the operation will be substantially the opposite of that described above.

A significant operative relationship of the present invention exists with respect to the lugs and the sealing member utilized to secure a pressure-tight engagement between the plug and the access opening or adaptor plate as the case may be. As illustrated in Figures 1–8 the sealing member may take the form of an O-ring disposed within an annular groove in the body of the plug. As described above, the plug member may be easily placed within the access opening so that the lower surface of the O-ring engages the upper edge of the access opening and then rotated so that the inserting surfaces of the lugs will be brought into engagement. It will be seen that with the plug member thus initially positioned with the O-ring sealing member engaged within the access opening, the plug acts somewhat as a piston within a cylinder so that considerable force is necessary to move the same axially inwardly of the opening against the pressure within the pump housing. By inclining the inserting surfaces in oppositely facing directions, it is possible to bring the surfaces into operative engagement without any movement against pressure, but yet provide against direct outward axial movement of the plugs when the surfaces are engaged. With the inserting surfaces in engagement, the plug member may then be rotated and by virtue of the wedging action between the surfaces, the plug is caused to move axially within the access opening against the pressure in the housing. It will be understood that where the plug is utilized in the access opening of the discharge side of the pump, such as illustrated in Figure 8, the movement of the plug axially inwardly may involve an operation against the flow of fluid within the pump. With the present arrangement of inserting surfaces, the plug member readily moves into locking engagement by simple rotation thereof after the plug has been initially positioned. In this manner, the bothersome and difficult task of trying to stab a quick change plug within its opening against a flow of fluid is readily eliminated.

The engagement of the locking surfaces 80 and 108 is over a sufficient area so as to easily withstand the high pressure present within the pump during operation thereof and it will be noted that the O-ring sealing member is firmly engaged within the access opening a substantial distance so as to insure a pressure-tight fit.

Figure 12:
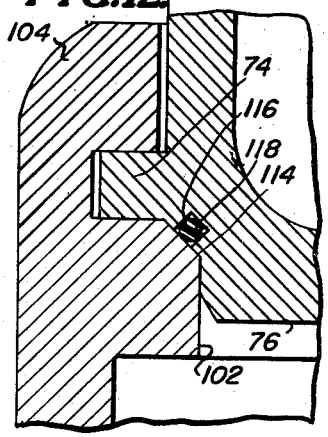
Figures 12-15 are fragmentary sectional views illustrating modified forms of the sealing means of the present invention.

While the sealing member is described above as comprising an O-ring sealing member disposed within an annular groove formed in the vertical wall of the body of the plug member, it will be understood that other arrangements and types of sealing members may be utilized. For example, in Figure 12, there is shown a sealing arrangement wherein the upper edge portion of the valve access opening 102 is flared outwardly as at 114 to form a flat inclined annular surface to receive an O-ring sealing member 116 disposed in an annular groove 118 formed in an outwardly flared portion of the body of the plug member.

Figure 13:
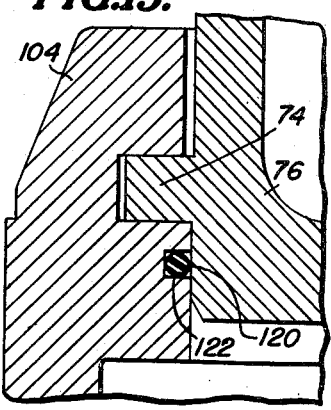

Another arrangement of the sealing member is illustrated in Figure 13, wherein an O-ring sealing member 120 is disposed within a groove 122 formed in the pump itself, rather than in the plug member as described above.

Figure 14:
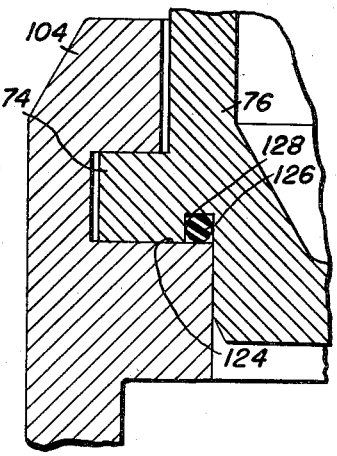

A further embodiment of the sealing member is shown in Figure 14 wherein an upwardly facing annular, horizontal surface 124 formed in the valve access opening 102 receives an O-ring sealing member 126 disposed within an annular groove 128 formed in a downwardly facing cooperating surface of the plug member.

Figure 15:
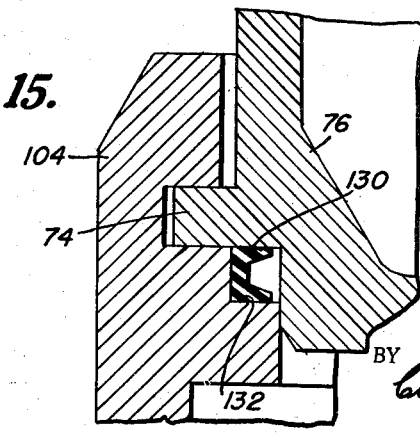

A still further modification of the sealing arrangement is illustrated in Figure 15 wherein an annular lip-type sealing member 130 is disposed within an annular groove 132 formed in the upper portion of the valve access opening.

In general, the operation described above in connection with the O-ring sealing member 58 is likewise applicable to the modified forms of sealing arrangements illustrated in Figures 12–15.

It will be noted that with the provision of separate inclined removing surfaces, the plug member may be readily removed from the access opening where a negative pressure exists within the adjacent portion of the pump housing. Thus, where a partial vacuum is contained within the pump and the plug is thereby urged to remain in its locked position within the access opening, the removing surfaces 84 and 112 will act to positively move the plug member axially outwardly of the access opening during rotation thereof in the opposite direction.

It can thus be seen that there has been provided an improved means for quickly moving two members into a locked and unlocked position with respect to each other which includes first cooperating surfaces to move the members in one direction against forces acting in the opposite direction, second cooperating surfaces for maintaining the members in the locked relationship to each other, and third cooperating surfaces for moving the members in an opposite direction against forces tending to move them in a reverse direction. As applied to an oil well pump of the type described above, the invention provides first pairs of cooperating surfaces to move a plug within a valve access opening against a pressure, second pairs of cooperating surfaces to move the plug against a vacuum within the pump and a third pair of cooperating surfaces to lock the plug within the access opening.

In addition, the invention as applied to an oil well pump access opening provides an improved adaptor plate whereby the conventional bolted down closure member may be readily replaced by a quick change plug assembly embodying the present invention. Furthermore, where it is necessary to utilize a plug which will move into locked position by rotation in a counterclockwise direction, there is provided by the present invention a novel plug arranged to be utilized with an adaptor plate either of the left hand or right hand type.

The invention further provides a novel sealing arrangement which assures a pressure-tight engagement of the plug member over the access opening and which cooperates with the locking means to provide an effective closure which may be readily removed and inserted so that the problems incident to the cleaning, faulty operation, and other problems enumerated above which have heretofore been experienced in the operation of mud circulating pumps for drilling oil wells may be conveniently and readily alleviated.

It is to be understood that the form of the invention herewith shown and described is to be taken as the preferred embodiment of the same and that various changes may be made without departing from the spirit of the invention or the scope of the appended claims.

We claim:

1. In a coupling, a first member having an annular portion provided with a plurality of annularly spaced lugs, a second member having an annular portion provided with a plurality of cooperating lugs arranged to pass axially within the spaces between the lugs of said first member whereby adjacent lugs of each member may be brought into engagement by relative rotation of said members, each pair of engaging lugs having oppositely faced inclined inserting surfaces engageable upon relative rotation of said members in one direction to move the same axially toward each other and oppositely faced locking surfaces extending at an angle from said inserting surfaces engageable upon further relative rotation of said members to hold the same axially together, the lugs of one of said members having inclined removing surfaces facing in a direction opposite to their associated inserting surfaces, the other of said members including a second plurality of annularly spaced lugs spaced axially from the first plurality of lugs thereof and displaced radially with respect thereto, said second plurality of lugs having inclined removing surfaces thereon facing in a direction opposite to said first mentioned removing surfaces, said removing surfaces being engageable upon relative rotation of said members in the opposite direction after disengagement of said locking surfaces to move said members axially away from each other.

2. In combination, a pump member having a valve access opening therein, a plurality of annularly spaced lugs carried by said pump member encircling said opening, each of said lugs having an inwardly facing inclined inserting surface and an inwardly facing locking surface extending at an angle therefrom, a plug member for closing said opening having a plurality of cooperating annularly spaced lugs secured thereto and arranged to pass axially within the spaces between the lugs of said pump member, each of the lugs of said plug member having an outwardly facing inclined inserting surface for engaging one of said first mentioned inserting surfaces to move said plug member axially toward said opening upon rotation thereof in one direction and an outwardly facing locking surface extending from said inserting surface for engaging one of said first mentioned locking surfaces upon further rotation of said plug to hold the latter in place, the lugs of one of said members having outwardly facing inclined removing surfaces thereon, the other of said members including a second plurality of annularly spaced lugs spaced axially from the first plurality of lugs thereof and displaced radially with respect thereto, said second plurality of lugs having outwardly facing inclined removing surfaces engageable with said first mentioned removing surfaces to move said plug member axially away from said opening upon rotation of said plug member in the opposite direction after disengagement of said locking surfaces.

3. Apparatus as defined in claim 2 wherein the lugs carried by said pump member are integral with a plate bolted to said pump member adjacent said opening, said plate having an opening therein registering with said valve access opening.

4. Apparatus as defined in claim 2 wherein said second plurality of lugs is mounted on said plug member.

5. Apparatus as defined in claim 4 wherein said second plurality of lugs include second removing surfaces oppositely inclined from their first mentioned removing surfaces and wherein the first plurality of lugs of said plug member include second inserting surfaces oppositely inclined from their first mentioned inserting surfaces.

6. Apparatus as defined in claim 2 wherein said plug member includes a portion axially seating within said opening and wherein an annular seating element is provided between said portion and said opening.

7. A quick change pressure plug comprising an annular body member, a plurality of lower annularly spaced lugs extending outwardly from said body member, each of said lower lugs including an upwardly facing inclined inserting surface extending upwardly from one end thereof and an upwardly facing locking surface extending at an angle from said inserting surface, and a plurality of upper annularly spaced lugs extending outwardly from said body member, said upper lugs being spaced axially from said lower lugs and displaced radially with respect thereto, each of said upper lugs including a downwardly facing inclined removing surface extending downwardly from the end of said lug opposite to the inserting surface end of said lower lugs.

8. A plug as defined in claim 7 wherein said body member includes a portion extending below said lower lugs, said portion having an annular groove therein for receiving an annular sealing element.

9. A quick change pressure plug for use in cooperation with closure plates requiring said plug to be moved into locking engagement therewith by opposite rotation comprising an annular body member, a plurality of lower annularly spaced lugs extending outwardly from said body member, each of said lower lugs including opposed upwardly facing inclined inserting surfaces extending upwardly from opposite ends thereof and an upwardly facing locking surface extending at an angle between said inserting surfaces, and a plurality of upper annularly spaced lugs extending outwardly from said body member, said upper lugs being spaced axially from said lower lugs and displaced radially with respect thereto, each of said upper lugs including opposed downwardly facing removing surfaces extending downwardly from opposite ends thereof.

References Cited in the file of this patent

UNITED STATES PATENTS

| | | |
|---|---|---|
| 492,227 | O'Neil | Feb. 21, 1893 |
| 1,239,453 | Block | Sept. 11, 1917 |
| 1,613,251 | Stead | Jan. 4, 1927 |
| 1,735,056 | Richey | Nov. 12, 1929 |
| 2,218,188 | Wittenberg | Oct. 15, 1940 |
| 2,257,715 | Hopkins | Sept. 30, 1941 |
| 2,534,164 | Finch | Dec. 12, 1950 |
| 2,621,017 | Yohpe | Dec. 9, 1952 |
| 2,675,939 | Fraser | Apr. 20, 1954 |